Patented June 10, 1941

2,244,855

UNITED STATES PATENT OFFICE 2,244,855

PROCESS FOR RIPENING CELLULOSE ESTERS

George Schneider, Montclair, N. J., assignor to Celanese Corporation of America, a corporation of Delaware No Drawing. Application March 4, 1939, Serial No. 259,800

12 Claims. (Cl. 260—230)

This invention relates to the preparation of organic esters of cellulose, and relates more particularly to an improved method of ripening or hydrolyzing the organic esters of cellulose.

An object of this invention is the economic and expeditious production of cellulose esters that require no stabilizing treatment after the ripening operation. Another object of this invention is the provision of an improved method of ripening, hydrolyzing or modifying the solubility characteristics of cellulose esters wherein the time for effecting this operation is substantially reduced.

Other objects of this invention will appear from the following detailed description and the appended claims.

In the process of preparing organic esters of cellulose, the esterification of cellulose is usually carried out by treating cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible.

The present invention may be employed in the making of any suitable organic ester of cellulose such as cellulose formate, cellulose acetate, cellulose propionate and cellulose butyrate. Cellulose in any suitable form, such as cotton, cotton linters, wood pulp made by either the sulphite or soda process, reconstituted cellulose, etc., may be employed in making the cellulose esters. The cellulose may be activated by pretreatment with lower aliphatic acids, etc. The esterifying agent may be formic acid, acetic anhydride, propionic anhydride or butyric anhydride depending upon the ester to be formed. The esterification may be carried out in the presence of a suitable catalyst such as sulphuric acid, sodium bisulphate, methyl sulphate or a mixture of these with each other or with other catalysts such as zinc chloride. However, for the sake of simplicity this invention will be described in connection with the preparation of cellulose acetate which is at the present time commercially the most important of the cellulose esters.

Thus, in preparing cellulose acetate by the prior process such as outlined above for the preparation of cellulose esters, cellulose is acetylated by treatment with acetic anhydride and a catalyst, such as sulphuric acid, in the presence of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose acetate may be washed with water to remove as much acid and other non-cellulose acetate ingredients of the acetylation mixture as possible.

The cellulose acetate so formed contains sulphur in the form of various compounds which impair the stability of the cellulose acetate and impart thereto the tendency to decompose, degrade and/or discolor. There may also be formed cellulose derivatives that tend to decompose and break down in the presence of the sulphur compound.

In accordance with this invention the cellulose acetate in primary solution is ripened in such a manner that more of the sulphur compounds and the unstable compounds are removed or converted into non-decomposing or non-deteriorating compounds than by prior processes. By the method of this invention, therefore, the cellulose acetate is made more stable than those produced by prior ripening processes.

In accordance with this invention I produce cellulose acetate that has the desired solubility characteristics and that is more stable than cellulose acetate made by prior processes by adding a polyhydric alcohol such as glycol, glycerine, etc., and preferably a mixture of water and polyhydric alcohol, to the primary solution containing the cellulose acetate dissolved in concentrated acetic acid and the sulphuric acid employed as the catalyst in the acetylation process, allowing the same to stand at a constant temperature until the cellulose acetate is ripened and then precipitating the cellulose acetate in any suitable manner. For example, I obtain cellulose acetate that is soluble in acetone and that is more stable than cellulose acetate produced by the use of other ripening agents such as water, by ripening the cellulose acetate in the primary solution in the presence of glycerine or of a glycerine/water mixture containing from 4 parts of glycerine to 8 parts of water to 12 parts of glycerine to 4 parts of water. After a ripening period of from 19 to 24 hours at a temperature of 24° C., as compared with the 40 hour ripening period necessary when water is employed as the ripening agent, the acetyl value of the cellulose acetate has been reduced to such an extent that the cellulose acetate is soluble in acetone and is of good stability.

As illustrations of my invention without being limited thereto, the following examples are given.

*Example I*

170 parts of cotton linters are added to a mixture of 630 parts of glacial acetic acid and 350 parts of acetic anhydride, containing 25 parts of sulphuric acid, the parts being by weight. The acetylation is preferably carried out with cooling. Water in a quantity only just sufficient to convert the excess of acetic anhydride to acetic acid is then added.

After the reaction of the cellulose to cellulose acetate is completed, 13.3 parts by weight of glycerine are added to 260 parts by weight of the primary solution (containing 63.7 parts by weight of cellulose acetate). The solution is allowed to stand at a constant temperature of 24° C. until cellulose acetate of the required acetone solubility is obtained. It is found that this point is reached in 19 hours. The cellulose acetate thus formed is of greater stability than cellulose acetate obtained using, say, water as the ripening agent.

*Example II*

To 260 parts by weight of the above primary solution is added a mixture containing 4 parts by weight of glycerine and 4 parts by weight of water. The solution is allowed to stand at a constant temperature of 24° C. until cellulose acetate of the required acetone solubility is obtained. It is found that this point is reached in 24 hours. The cellulose acetate thus formed is of greater stability than cellulose acetate obtained by the use of water as the ripening agent.

It is to be understood that the foregoing detailed description is merely given by way of illustration and that many variations may be made therein without departing from the spirit of my invention.

Having described my invention, what I desire to secure by Letters Patent is:

1. Process for the manufacture of lower fatty acid esters of cellulose, which comprises adding a polyhydric alcohol selected from the group consisting of glycol and glycerine to a primary solution containing the lower fatty acid ester of cellulose dissolved in concentrated organic acid and also containing the strong catalyst containing the sulphate radicle employed in the esterification process in a proportion of substantially 15% based on the weight of the cellulose employed, permitting the solution to stand until the lower fatty acid ester of cellulose has attained the required solubility characteristics and then precipitating the lower fatty acid ester of cellulose from the solution.

2. Process for the manufacture of cellulose acetate, which comprises adding a polyhydric alcohol selected from the group consisting of glycol and glycerine to a primary solution containing the cellulose acetate dissolved in concentrated acetic acid and also containing the strong catalyst containing the sulphate radicle employed in the acetylation process in a proportion of substantially 15% based on the weight of the cellulose employed, permitting the solution to stand until the cellulose acetate has attained the required acetone solubility and then precipitating the cellulose acetate from the solution.

3. Process for the manufacture of lower fatty acid esters of cellulose, which comprises adding a polyhydric alcohol selected from the group consisting of glycol and glycerine to a primary solution containing the lower fatty acid ester of cellulose dissolved in concentrated organic acid and also containing sulphuric acid employed as catalyst in the esterification process in a proportion of substantially 15% based on the weight of the cellulose employed, permitting the solution to stand until the lower fatty acid ester of cellulose has attained the required solubility characteristics and then precipitating the lower fatty acid ester of cellulose from the solution.

4. Process for the manufacture of cellulose acetate, which comprises adding a polyhydric alcohol selected from the group consisting of glycol and glycerine to a primary solution containing the cellulose acetate dissolved in concentrated acetic acid and also containing sulphuric acid employed as catalyst in the acetylation process in a proportion of substantially 15% based on the weight of the cellulose employed, permitting the solution to stand until the cellulose acetate has attained the required acetone solubility and then precipitating the cellulose acetate from the solution.

5. Process for the manufacture of lower fatty acid esters of cellulose, which comprises adding a polyhydric alcohol selected from the group consisting of glycol and glycerine to a primary solution containing the lower fatty acid ester of cellulose dissolved in concentrated organic acid and also containing sulphuric acid employed as catalyst in the esterification process in a proportion of substantially 15% based on the weight of the cellulose employed, permitting the solution to stand for 19 to 24 hours, whereby the lower fatty acid ester of cellulose attains the required solubility characteristics, and then precipitating the lower fatty acid ester of cellulose from the solution.

6. Process for the manufacture of cellulose acetate, which comprises adding a polyhydric alcohol selected from the group consisting of glycol and glycerine to a primary solution containing the cellulose acetate dissolved in concentrated acetic acid and also containing sulphuric acid employed as catalyst in the acetylation process in a proportion of substantially 15% based on the weight of the cellulose employed, permitting the solution to stand for 19 to 24 hours, whereby the cellulose acetate attains the required acetone solubility, and then precipitating the cellulose acetate from the solution.

7. Process for the manufacture of lower fatty acid esters of cellulose, which comprises adding a mixture of water and a polyhydric alcohol selected from the group consisting of glycol and glycerine to a primary solution containing the lower fatty acid ester of cellulose dissolved in concentrated organic acid and also containing sulphuric acid employed as catalyst in the esterification process in a proportion of substantially 15% based on the weight of the cellulose employed, permitting the solution to stand until the lower fatty acid ester of cellulose has attained the required solubility characteristics, and then precipitating the lower fatty acid ester of cellulose from the solution.

8. Process for the manufacture of cellulose acetate, which comprises adding a mixture of water and a polyhydric alcohol selected from the group consisting of glycol and glycerine to a primary solution containing the cellulose acetate dissolved in concentrated acetic acid and also containing sulphuric acid employed as catalyst in the acetylation process in a proportion of substantially 15% based on the weight of the cellulose employed, permitting the solution to stand until the cellulose acetate has attained the required acetone solubility, and then precipitating the cellulose acetate from the solution.

9. Process for the manufacture of lower fatty acid esters of cellulose, which comprises adding a mixture of water and a polyhydric alcohol selected from the group consisting of glycol and glycerine to a primary solution containing the lower fatty acid ester of cellulose dissolved in concentrated organic acid and also containing sulphuric acid employed as catalyst in the esterification process in a proportion of substantially 15% based on the weight of the cellulose employed, permitting the solution to stand for 19 to 24 hours, whereby the lower fatty acid ester of cellulose attains the required solubility characteristics, and then precipitating the lower fatty acid ester of cellulose from the solution.

10. Process for the manufacture of cellulose acetate, which comprises adding a mixture of water and a polyhydric alcohol selected from the group consisting of glycol and glycerine to a primary solution containing the cellulose acetate dissolved in concentrated acetic acid and also containing sulphuric acid employed as catalyst in the acetylation process in a proportion of substantially 15% based on the weight of the cellulose employed, permitting the solution to stand for 19 to 24 hours, whereby the cellulose acetate attains the required acetone solubility, and then precipitating the cellulose acetate from the solution.

11. Process for the manufacture of cellulose acetate, which comprises adding 13.3 parts by weight of glycerine to a primary solution containing 63.7 parts by weight of cellulose acetate dissolved in concentrated acetic acid and also containing 5.5 parts by weight of sulphuric acid employed as catalyst in the acetylation process, permitting the solution to stand at a temperature of 24° C. for 19 hours, whereby the cellulose acetate attains the required acetone solubility, and then precipitating the cellulose acetate from the solution.

12. Process for the manufacture of cellulose acetate, which comprises adding a mixture of 4 parts by weight of glycerine and 4 parts by weight of water to a primary solution containing 63.7 parts by weight of cellulose acetate dissolved in concentrated acetic acid and also containing 5.5 parts by weight of sulphuric acid employed as catalyst in the acetylation process, permitting the solution to stand at a temperature of 24° C. for 24 hours, whereby the cellulose acetate attains the required acetone solubility, and then precipitating the cellulose acetate from the solution.

GEORGE SCHNEIDER.